United States Patent [19]

Nixon

[11] 4,434,684
[45] Mar. 6, 1984

[54] SELF-CENTERING SAW MOUNT

[75] Inventor: Keith L. Nixon, Pleasant Hill, Oreg.

[73] Assignee: Bell Industries, Inc., Los Angeles, Calif.

[21] Appl. No.: 367,583

[22] Filed: Apr. 12, 1982

[51] Int. Cl.³ .............................................. B23D 63/14
[52] U.S. Cl. ........................................... 76/37; 76/79; 279/2 R; 279/111
[58] Field of Search ..................... 76/79, 77, 78 R, 37, 76/40, 41; 279/2 R, 111 R

[56] References Cited

U.S. PATENT DOCUMENTS

| 609,019 | 8/1898 | Gibbs . | |
|---|---|---|---|
| 1,751,023 | 3/1929 | Aune . | |
| 2,779,275 | 1/1957 | Spainhour | 279/111 |
| 2,825,572 | 3/1956 | Sloan et al. . | |
| 4,177,914 | 12/1979 | Clavin | 279/119 |
| 4,222,577 | 9/1980 | Giffin | 279/114 |

FOREIGN PATENT DOCUMENTS 2000372 1/1970 Fed. Rep. of Germany .
2310181 5/1975 France .

Primary Examiner—Roscoe V. Parker
Attorney, Agent, or Firm—Kolisch, Hartwell & Dickinson

[57] ABSTRACT

A mounting for a circular saw which rotatably supports the saw in a grinding machine. The mounting includes a mounting plate, and three roller mounts mounted for movement on the mounting plate in paths that diverge from each other extending outwardly from a common center. Each roller mount mounts a roller which engages the edge in a saw defining the edge of the saw.

8 Claims, 5 Drawing Figures

U.S. Patent     Mar. 6, 1984     4,434,684
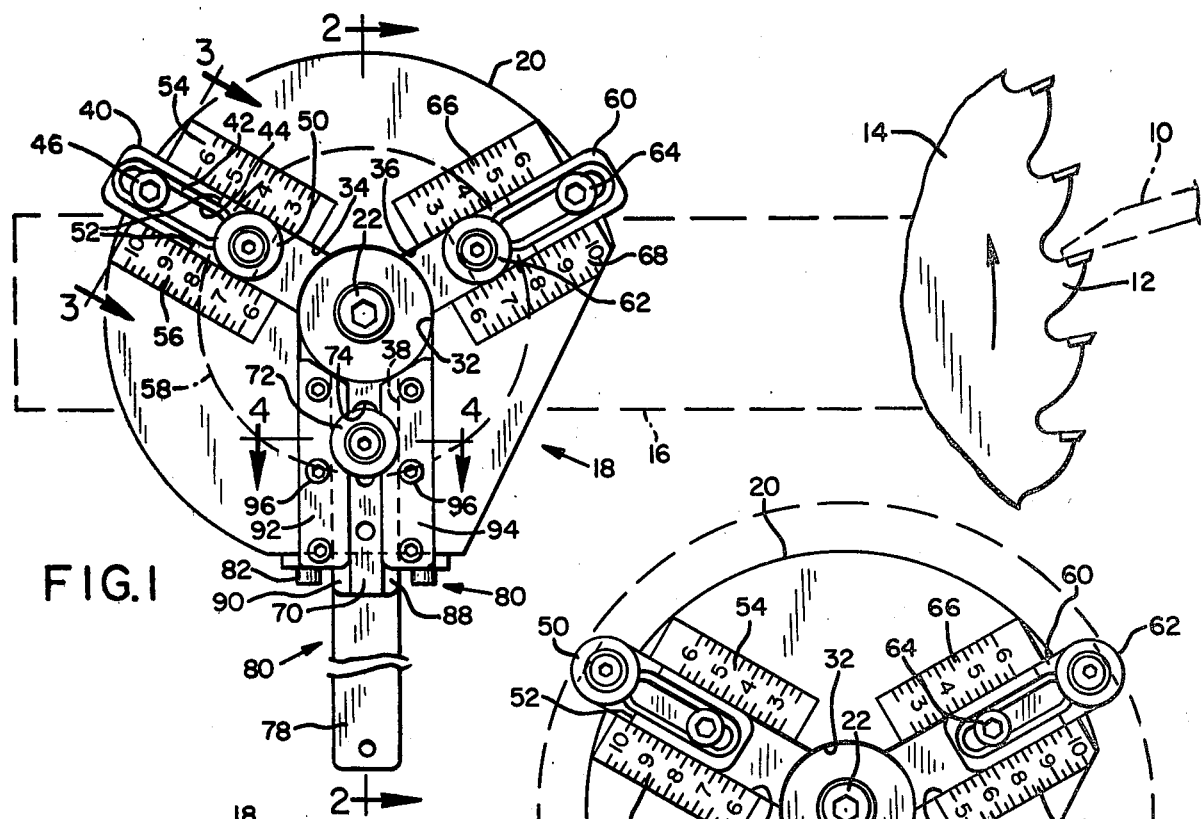
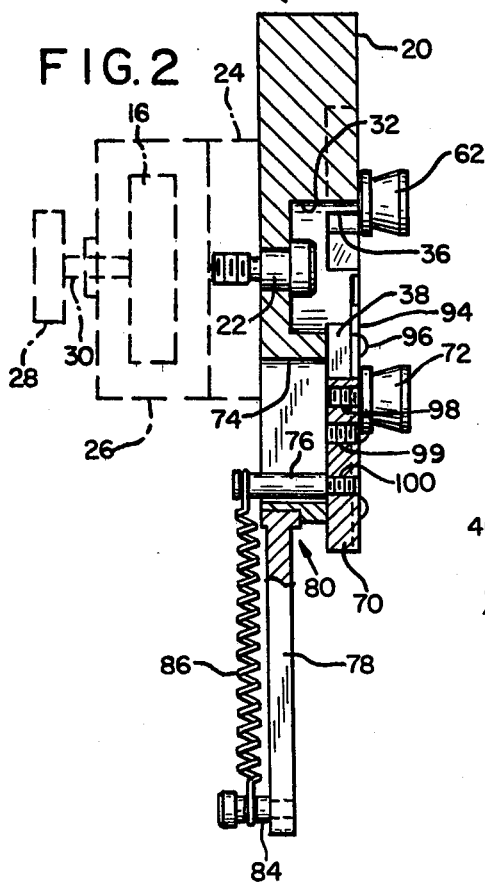
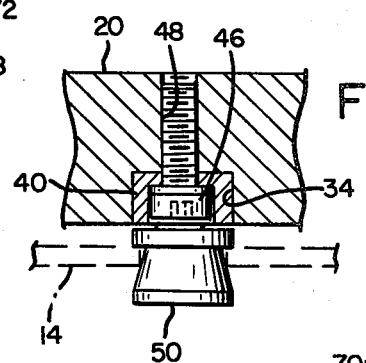
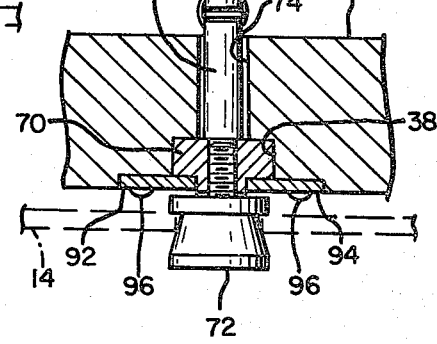

SELF-CENTERING SAW MOUNT

BACKGROUND AND SUMMARY OF THE INVENTION

This invention relates to a mounting for circular saws for rotatably supporting the saw in a grinding machine.

Grinding machines for grinding the teeth of circular saws commonly include a power-driven grinding wheel and a mounting for the circular saw spaced from the grinding wheel which supports the saw during the grinding operation. In grinding machines, the saw mounting is such as to enable the saw to be rotated in increments, whereby to place successive teeth on the edge of the saw in a grinding station in the machine where the grinding operation actually takes place.

Any means provided for mounting a saw in grinders of the above general description optimally should readily accommodate saws of widely different diameters and sizes. A mounting which must be disassembled to permit placement of the saw in place is disadvantageous, since this means that parts must be removed, creating the possibility that such parts are lost. If adjustments are to be made in a mounting to permit the same to handle a different size of saw, obviously, it is advantageous that such adjustments be made readily and accurately.

Generally, an object of this invention is to provide, for grinding machines, an improved means for mounting the saw to be ground which readily accommodates the mounting of a saw in place.

Another object is to provide such a mounting means which results in the saw being accurately positioned with respect to a grinding station in the machine.

A further object is to provide a saw mounting which may be adjusted to handle different sizes of saws, and which, for a wide range of saw sizes, does not require dismantling of the mounting.

With the saw mounting comtemplated, adjustments to handle different saw sizes are quickly and accurately made.

These and other objects and advantages are attained by the invention, which is described hereinbelow in conjunction with the accompanying drawings, wherein:

FIG. 1 illustrates portions of a grinding machine, illustrating in dashed outline part of a bar in the machine which extends out from a grinding station, and in solid outline a saw mounting employed to mount a circular saw while such is being ground;

FIG. 2 is a cross-sectional view, taken generally along the line 2—2 in FIG. 1;

FIG. 3 is a cross-sectional view, on a somewhat enlarged scale;

FIG. 4 is a view on the same scale as FIG. 3, taken generally along the line 4—4 in FIG. 1; and FIG. 5 is a view similar to portions of FIG. 1 but showing the saw mounting means after adjustments have been made therein.

A DETAILED DESCRIPTION OF A PREFERRED EMBODIMENT OF THE INVENTION

Referring now to the drawings and, more particularly, to FIG. 1, the usual grinding machine includes a frame and a power-driven grinding wheel arbor which mounts a grinding wheel, whereby the grinding wheel is rotated under power. Typically, the mounting for the grinding wheel arbor is such as to enable the grinding wheel, which is rotated by the arbor, to be advanced and retracted whereby the edge of the grinding wheel may be advanced to move over the tooth to be ground and then retracted after the grinding operation. Thus, and referring to FIG. 1, portions of a grinding wheel are shown in dashed outline at 10, and the grinding wheel is shown in the position that it has after advancing over the face of a tip in a tooth 12 in circular saw 14. The grinding wheel is moved to the right in FIG. 1 to retract it from the saw, whereby the edge of the wheel is clear of the tooth. This frees the saw whereby it may be rotated to place the next successive tooth in the grinding station and in a position to be ground by the grinding wheel. Also shown in FIG. 1, in dashed outline at 16, is an arm which is suitably mounted on the frame of the grinding machine, and which extends outwardly from the grinding station. The arm supports a saw mounting means 18 utilized in mounting the saw while it is being ground. Mounting means 18 holds a saw through means engaging the edge that defines the eye of the saw, and supports the saw with the outer edge thereof, movable through the grinding station of the grinder.

Considering now details of the saw mounting means, indicated generally at 20 is a mounting plate. The plate is secured by shoulder bolt 22 to a suitable support such as the block shown in dashed outline at 24 disposed to the rear of the plate. Block 24 is mounted in a suitable manner on means supported by the arm 16 which permits adjustments in the position of the saw mounting means along the length of the arm to accommodate different diameters of saws. Specifics of constructions of different types of mounting are not deemed important to an understanding of the instant invention, and various forms of constructions may be employed. Exemplary of a support is the sleeve shown at 26 which fits about arm 16. The sleeve is secured in a given adjusted position on the arm in a suitable manner, as by turning hand wheel 28 so as to advance clamp screw 30 which is secured to the hand wheel into frictional engagement with a side of the arm.

Mounting plate 20 in the particular form of the invention shown is substantially circular in outline, and is provided at the center thereof with a cylindrical recess or cavity 32. The head of shoulder bolt 22 earlier described rests against the floor of this cavity.

Formed in the face of the mounting plate, and extending radially outwardly from the center of cavity 32, are three elongate passages 34, 36 and 38. These passages are equally angularly distributed about the center of cavity 32, which is to say, by reason of there being three, that the passage are angularly spaced 120° from each other.

Considering specifically passage 34, mounted for adjustable movement along the length of the passage is a guide or roller mount 40 in the form of an elongate block which snugly fits within the passage. The block includes an elongate channel 42 extending along it, and along the floor of the base of this channel, an elongate groove 44. The block is secured in an adjusted position in the passage through socket head screw 46 which has its threaded shank screwed into an internally threaded bore 48 (See FIG. 3) and which has its head end lodged within channel 42.

Rotatably mounted on the block which forms the roller mount, adjacent its inner end in FIG. 1, is a roller 50.

The block that forms roller mount 40 has a face which is exposed on the front side of mounting plate 20, and this face may be provided with calibration lines indicated at 52. Along either side of groove 34 are rows of calibration markings, indicated at 54 and 56. With the block positioned as shown in FIG. 1, the calibration line 52, on the upper side of the block as illustrated registers with a calibration line in row 54 identified by the number "5". This indicates to the operator that the block is positioned to properly mount a saw having a five-inch diameter eye at the center thereof. The outline of a five-inch diameter eye is indicated in FIG. 1 at 58. Movement of the roller mount radially inwardly to place its upper calibration line 52 opposite the calibration line identified by the number "4" would place the roller mount in a position properly to mount a saw having a four-inch diameter eye at the center thereof. Similar adjustments would be made to handle saws with three-inch diamter eyes (move further inwardly), and six-inch diameter eyes (with movement of the roller mount radially outwardly).

Referring to FIG. 5, if the roller mount is removed from the passage receiving it, turned end for end, and then returned to passage 34, it will appear as shown in FIG. 5. In this position, the end of the roller mount mounting the roller is the radially outer end, rather than the radially inner end as previously positioned. When so positioned, the calibrations in row of calibrations 56 are utilized in conjunction with one of the lines 52 on the roller mount to indicate the size of saw properly handled.

Passage 36, earlier described, is used in the mounting of a guide or roller mount 60. The construction of this roller mount is the same as the construction of roller mount 40 earlier discussed. Rotatably supported on one end of the roller mount is a roller 62. Securing the mount in an adjusted position is a socket head screw 64. Rows of calibrations 66, and 68 are used in the positioning of the roller mount in the same manner as the rows of calibrations discussed in connection with roller mount 40.

Passage 38 slidably supports a roller mount 70. This also comprises an elongate block rotatably supporting adjacent one end a roller 72. This block is not secured in position as are the blocks forming roller mounts 40 and 60, but is acted upon by a spring whereby any saw having the edge which defines its eye resting on rollers 50 and 62 will be firmly held in place on these rollers in proper position defined by the rollers. Thus, mounting plate 20, adjacent its bottom extremity, includes extending radially therealong an elongate slot 74. Riding within this slot is a pin 76 having its threaded extremity screwed into roller mount 70. Leg 78 of a T-shaped element 80 fastened to the mounting plate by fasteners 82 mounts a post 84 at its lower extremity. Extending between this post and the outer end of pin 76 is a coil tension spring 86. The spring biases the pin and the block forming roller mount 70 to its lower limit position, which is determined by the pin engaging the lower end of slot 74.

The block forming roller mount 70 is channeled along opposite side margins by channel 88, 90. Retainer plates 92, 94, with inner margins riding in the channels serves to keep the block forming roller mount 70 within the passage receiving it. The retainer plates are detachably secured to the mounting plates by fasteners 96.

Generally summarizing the organization described, the blocks forming the guides or roller mounts are movable in paths occupying substantially a common plane extending radially outwardly from a center. The blocks forming the upper two roller mounts in FIG. 1 are secured in place in different adjusted positions depending upon the size of the eye of the saw being handled. The block forming the lower roller mount is not secured in a given adjusted position, but is biased outwardly by the action of the coil spring described.

To mount a saw, it is an easy matter to move a lower portion of the edge defining the eye of the saw over roller 72 to an approximately seated position. By then moving the saw upwardly, which is yieldably accommodated by upward movement of the block forming mount 70 upwardly in its path, upper portions of the edge defining the eye of the saw may be slipped over rollers 50, 62 into a seated position. With release of the saw, the saw becomes snugly mounted in place, in an accurately centered position with respect to the mounting means.

The saw, when mounted, is supported by rollers which rotatably accommodate rotation of the saw to place successive teeth in the grinding station.

It has already been described how the blocks forming mounts 40 and 60 may be detached and remounted after turning end for end, to accommodate the mounting of saws having central eyes in the larger range sizes. Where needed to handle saws with central eyes of larger sizes, the block forming mount 70 may also be removed by removing pin 76 from its threaded bore 100 and then inverting the mount, end for end. With reinsertion of the mount and remounting of the pin in the bore 100, the mount appears as illustrated in FIG. 5. Roller 72 is shown mounted in a threaded bore 98 (see FIG. 2) and another threaded bore 99 is provided in the mount between bores 98 and 100. Bore 99 may be utilized in the mounting of pin 76 to place the block forming mount 70 and the roller that it mounts in a different position for biased movement.

It should be obvious from the above that saws having widely different sizes of central eyes may be handled. Where it is desired, for instance, to sharpen a plurality of saws all having a common central eye diameter, such may be mounted and removed from the mounting in a simple and rapid manner and without detaching the parts. Minor adjustments in the size of saw eye handle are readily made merely by moving the mounts 40 and 60 along the length of the passages in which these mounts are received, with the calibrations provided indicating the exact position required for any particular size of saw.

While a particular embodiment of the invention has been described, it should be obvious that changes and variations are possible.

It is claimed and desired to secure by Letters Patent:

1. In a grinding machine, including a power-driven grinding wheel,
    means for rotatably mounting a circular saw with the edge of the saw moveable with rotation of the saw to place successive teeth in a position to be ground by the grinding wheel comprising:
    a mounting plate,
    first, second and third guide mounts mounted on said mounting plate for movement in paths which diverge from each other extending outwardly from substantially a common center, each guide mount mounting a guide adapted to engage the edge in a saw which defines the eye of the saw, means for securing a pair of said guide mounts in selected adjusted positions in their said paths, and biasing means yieldably urging the third guide mount outwardly in its path.

2. The grinding machine of claim 1, wherein the guide mounts are mounted for movement in paths which occupy substantially a common plane and which are substantially equally angularly spaced about said center.

3. The grinding machine of claim 1, wherein at least the first and second guide mounts have faces that are exposed on one side of said mounting plate, and said one side of the mounting plate and said faces of the guide mounts are provided with cooperating calibration markings.

4. The grinding machine of claim 1, which further includes a bar extending in the grinding machine outwardly from the location of the grinding wheel, a support mounted on said bar adjustable along the length of the bar, and wherein said mounting plate is mounted on said support.

5. In a grinding machine, including a power-driven grinding wheel, means for rotatably mounting a circular saw with the edge of the saw movable with rotation of the saw to place successive teeth in a position to be ground by the grinding wheel comprising:

a mounting plate, first, second and third guide mounts mounted on said mounting plate for movement in paths which diverge from each other extending outwardly from a common center, said paths occupying substantially a common plane and being substantially equally angularly spaced about said center, each of said guide mounts mounting a saw guide adapted to engage the edge in a saw which defines the eye of the saw, at least the first and second guide mounts having faces that are exposed on one side of said mounting plate and said one side of the mounting plate and said faces of the guide mounts being provided with cooperating calibration markings, means for securing said first and second guide mounts in selected adjusted positions in their said paths, and biasing means yieldably urging the third guide mount outwardly in its path.

6. A mounting for a circular saw to support the saw while such is being ground comprising:

a mounting plate, first and second roller mounts mounted on said mounting plate for movement in paths which occupy a common plane and which diverge from each other extending outwardly from a common center, each roller mount mounting a rotatable roller adapted to engage the edge in a circular saw which defines the eye of the saw, another roller mount mounted for movement in a path diverging from the paths of the first and second roller mounts and mounting a roller also adapted to engage the edge in a circular saw which defines the eye of the saw and the path of movement of said other mount also being in said plane, adjustable means associated with each of said first and second roller mounts for securing the mounts in selected adjusted positions in their said paths, and biasing means yieldably urging the third roller mount outwardly in its said path.

7. The mounting of claim 6, wherein said first and second roller mounts have faces that are exposed on one side of said mounting plate, and said one side of the mounting plate and said faces of the roller mounts are provided with cooperating calibration markings.

8. The grinding machine of claim 5, which further includes a bar extending in the grinding machine outwardly from the location of the grinding wheel, a support mounted on said bar adjustable along the length of the bar, and means securing said mounting plate on said support.

* * * * *